United States Patent [19]

Miller et al.

[11] Patent Number: 4,698,737
[45] Date of Patent: Oct. 6, 1987

[54] DC TO DC CONVERTER

[75] Inventors: Ira Miller, Tempe; John E. Hanna, Mesa, both of Ariz.

[73] Assignee: Motorola, Inc., Schaumburg, Ill.

[21] Appl. No.: 9

[22] Filed: Jan. 2, 1987

[51] Int. Cl.[4] .......................................... H02M 7/797
[52] U.S. Cl. ..................................... 363/63; 323/351
[58] Field of Search .................................. 363/59–63;
   323/349–351, 312, 315–317; 361/245, 246;
   307/236

[56] References Cited

U.S. PATENT DOCUMENTS

| 3,944,908 | 3/1976 | Oki | 363/63 X |
| 4,281,377 | 7/1981 | Evans | 363/63 |
| 4,320,447 | 3/1982 | Krauss | 363/63 |

*Primary Examiner*—Peter S. Wong
*Attorney, Agent, or Firm*—Michael D. Bingham

[57] ABSTRACT

A circuit is disclosed for establishing a regulated negative voltage at an output which comprises first and second power supply conductors to which are supplied a positive DC operating potential and ground potential respectively, a push-pull driver circuit coupled between the two power supply conductors which is responsive to an applied switching signal for alternately sourcing and sinking current at an output thereof, circuitry coupled to the push-pull driver circuit for clamping the voltage level at the output of the latter to a predetermined value when current is source at the output of the push-pull driver circuit, a first capacitor coupled between the output of the push-pull circuit and a first terminal, a second capacitor coupled between second and third terminals with the second terminal being coupled to the output of the converter circuit and the third terminal being coupled to ground potential, and diode circuitry for alternately providing charging paths for the first and second capacitors between the output of the push-pull driver circuit and ground potential to produce the regulated negative DC voltage as charge is transferred between the first and second capacitors.

8 Claims, 3 Drawing Figures

DC TO DC CONVERTER

BACKGROUND OF THE INVENTION

The present invention relates to converter circuits and, more particularly, to a circuit for converting a positive supply voltage to a negative output voltage.

The art is replete with +DC to −DC voltage converter circuits for generating a negative output DC voltage from a positive supply voltage. There are a myriad of systems applications for such converter circuits. For instance, many computer systems include a keyboard that is peripheral to the mainframe and are coupled to the central processing unit (CPU) through a coiled connecting cord. Usually the keyboard electronics is Transistor to Transistor Logic (TTL) compatible, with a high logic level of approximately 2.4 volts and a low logic level of 0.4 volts providing a two volt noise margin. Generally however, when the data from the keyboard electronics is interfaced to the CPU via the connecting cable a higher noise margin is desired wherein the TTL logic level swing is converted to a larger voltage swing such as the RS423 standard. The RS423 standard provides a minimum of 7.2 volts of noise margin with a single ended driver output swing of +/−3.6 volts. Because it is desirable to operate the keyboard electronics from a positive supply voltage a converter circuit is required to provide the negative voltage for the low level of the RS423 output.

Hence, a need exists for a simple, efficient circuit for converting a positive DC voltage to a regulated negative DC voltage which can be included in a single integrated keyboard system, for example.

SUMMARY OF THE INVENTION

Accordingly, it is an object of the present invention to provide an improved DC to DC converter circuit.

It is another object of the present invention to provide an improved converter circuit for efficiently converting a positive DC voltage to a regulated negative DC voltage.

In accordance with the above and other objects there is provided a circuit for establishing at an output a regulated negative voltage which comprises first and second power supply conductors to which are supplied a positive DC operating potential and ground potential respectively, a push-pull driver circuit coupled between the two power supply conductors which is responsive to an applied switching signal for alternately sourcing and sinking current at an output thereof, circuitry coupled to the push-pull driver circuit for clamping the voltage level at the output of the latter to a predetermined value when current is sourced at the output of the push-pull driver circuit, a first capacitor coupled between the output of the push-pull circuit and a first terminal, a second capacitor coupled between second and third terminals with the second terminal being coupled to the output of the converter circuit and the third terminal being coupled to ground potential, and diode circuitry for alternately providing charging paths for the first and second capacitors between the output of the push-pull driver circuit and ground potential to produce the regulated negative DC voltage as charge is transferred between the first and second capacitors.

DETAILED DESCRIPTION OF THE PREFERRED EMBODIMENT

Figure 1:
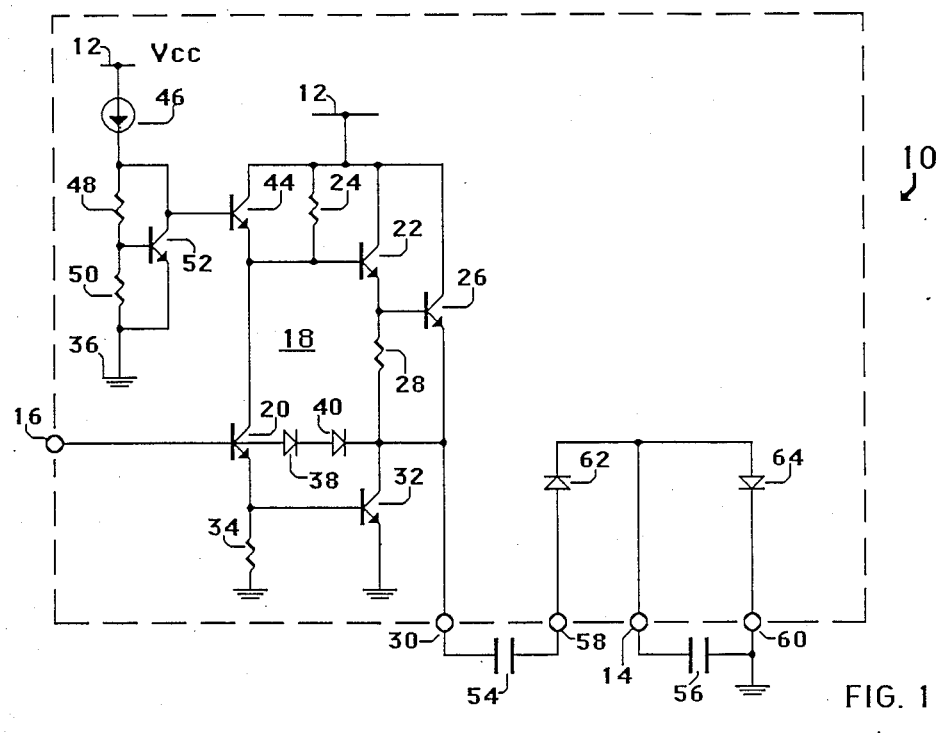
FIG. 1 is a schematic illustrating the converter circuit of the preferred embodiment.

Turning now to FIG. 1 there is shown converter circuit 10 of the present invention which is suited for converting a positive DC operating potential Vcc (approximately 12 volts) supplied to conductor 12 to a negative regulated output voltage of approximately −6 volts at output terminal 14. As understood, that portion of the circuitry of converter 10 shown enclosed within the dashed box is suited to be fabricated in integrated circuit form using standard integrated circuit process technology.

Converter 10 receives a switching or clock signal at input 16 for alternating switching push-pull driver stage 18 as will be described. Push-pull driver stage 18 is generally well known and comprises phase splitter transistor 20 which is responsive to the clock signal applied to the base thereof for supplying two out of phase driving signals at the collector and emitter thereof respectively. The collector of transistor 20 is coupled to the base of upper switching transistor 22 and via resistor 24 to conductor 12. Upper switching transistor 22 has its emitter coupled to the base of switching transistor 26 and via resistor 28 to output 30 and forms a Darlington current amplifier for sourcing current to output terminal 30 when both transistors are turned on. Lower switching transistor 32 sinks current at output 30 through its collector-emitter path as it is turned on by base current drive being supplied from the emitter of transistor 20. The emitter of transistor 20 is returned via resistor 34 to conductor 36 to which ground potential is supplied. Diodes 38 and 40 are serially coupled between the base of transistor 20 and the collector of transistor 32 to output 30 of the driver stage.

Circuitry for clamping the voltage at terminal 30 to a predetermined level as transistors 22 and 26 are turned on is provided which includes Nϕ circuit 42 and transistor 44. Nϕ circuit 42 includes current source 46 coupled between conductor 12 and resistor 48. Resistor 48 is connected in series with resistor 50 to conductor 36 with the interconnection therebetween being coupled to the base of transistor 52. The base of transistor 44 is coupled to the collector of transistor 52 with the collector-emitter conduction path of the latter being coupled between current source 46 and conductor 36.

Converter circuit 10 also includes a pair of external capacitors 54 and 56 between which charge is transferred as push-pull driver stage 18 is switched between states. Capacitor 54 is coupled between terminals 30 and 58 while capacitor 56 is coupled between output terminal 14 and terminal 60. Catch or steering diodes 62 and 64 provide charge paths for capacitors 54 and 56. Diode 62 has its anode coupled to output 14 and its cathode coupled with the anode of diode 64 to terminal 58, the cathode of the latter being coupled to terminal 60. To permit including diodes 62 and 64 on chip it is necessary to fabricate diode 62 from a NPN transistor having its collector-base together while diode 64 is formed of a collector-base shorted PNP transistor as is understood.

Figure 2:
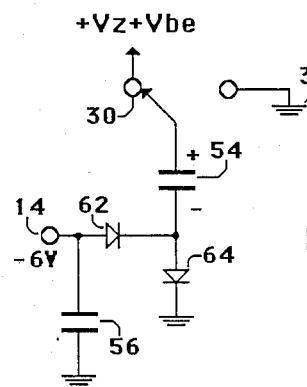
FIG. 2 is a schematic illustrating a portion of the circuitry of the converter of FIG. 1 when the latter is in a first switched state.
Figure 3:
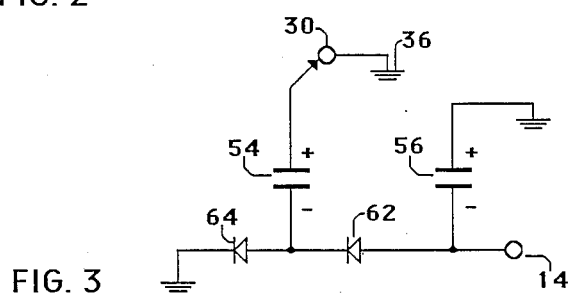
FIG. 3 is a schematic illustrating the circuit portion of FIG. 2 when the converter circuit of FIG. 1 is in a second switched state.

In operation, Nφ circuit 42 establishes a voltage equal to 3Vbe, where Vbe is the voltage drop across the base emitter of a transistor, at the base of transistor 44. In response to the clock signal applied to input 16 being low transistor 20 will be turned off thereby rendering upper switching transistors 22 and 26 fully conductive. Current is thus sourced to terminal 30 thereby charging capacitor 54 via diode 64 and terminal 60. As the voltage at terminal 30 increases to a positive value of approximately 6.8 volts transistor 44 will Zener as its base-emitter breakdown voltage is exceeded. Hence, a voltage equal to approximately (Vz+Vbe), where Vz is the Zener voltage of transistor 44, is established at terminal 30 which clamps the latter thereat. Thus, a voltage drop equal to Vz is established across capacitor 54 in the sense as shown in FIG. 2 since diode 64 has a voltage drop of Vbe thereacross. As the applied clock signal goes positive transistor 20 is turned on which steals base current drive from transistor 22 thereby essentially turning it off. Simultaneously, transistor 32 is turned on thus sinking current from terminal 30 and discharging capacitor 54 while capacitor 56 is charged. In this state the voltage level at terminal 30 will drop to near zero volts as indicated in FIG. 3. Hence capacitor 56 is charged from capacitor 54 via ground through diode 62 to establish a negative potential at output 14. The negative potential at output 14 is equal to approximately −6 volts which is equal to Vz−Vbe. After several cycles as described above after initial turn of the converter circuit the output voltage at terminal 14 will be regulated to the −6 volts.

Diodes 38 and 40 prevent transistor 32 from going into hard saturation as it is turned on since they will turn on if the potential at terminal 30 attempts to go to zero volts to steal base current drive form transistor 20. Similarly, transistor 20 is kept from becoming saturated by Nφ circuit 42 and transistor 44.

It should be noted that output node 30 is clamped to the voltage (Vz+Vbe) during positive excursions to prevent the charge of capacitor 54 from establishing a voltage in excess of the breakdown voltage of NPN diode 62 (which would otherwise breakdown at the value Vz). If terminal 30 were not clamped in this manner charge transferred between capacitors 54 and 56 would be less efficient as diode 62 would avalanche. Further, if catch diodes 62 and 64 are not as described substrate current injection will occur. If this were to happen possible latching may occur which can cause converter circuit 10 to become inoperative.

Hence, what has been described above is a novel converter circuit for generating a regulated −6 volts from a positive power supply which requires minimum die area. The circuit efficiently converts the positive DC voltage to the −6 volts by clamping the positive swing to a BVebo voltage and utilizing a pair of diodes. To permit integrating the semiconductor devices a pair of opposite conductivity type catch diodes were utilized comprising NPN and PNP diode connected transistors.

We claim:

1. A circuit for establishing a predetermined and regulated negative direct current (DC) voltage at an output, comprising:
   first and second power supply conductors;
   a push-pull driver stage coupled between said first and second power supply conductors which is responsive to an applied clock signal for alternately sourcing and sinking current at an output thereof;
   circuit means coupled to said push-pull driver stage for clamping the voltage level at said output of the latter to a predetermined value;
   a first charge storage device coupled between said output of said push-pull driver stage and a first terminal;
   a second charge storage device coupled between second and third terminals, said second terminal being coupled to the output of the circuit and said third terminal being coupled to ground potential;
   diode circuit means for alternately providing a charge circuit path for said first and second charge storage devices between said output of said push-pull driver stage and said third terminal such that charge is transferred therebetween to produce the negative voltage at the output of the circuit.

2. The circuit of claim 1 wherein said diode circuit means includes:
   a first diode of a first conductivity type coupled between said first and second terminals; and
   a second diode of a second conductivity type coupled between said first and third terminals.

3. The circuit of claim 2 wherein:
   said first diode comprises a NPN transistor having its base shorted to its collector to said second terminal and its emitter coupled to said first terminal; and
   said second diode comprises a PNP transistor having its base shorted to its collector to said first terminal and its emitter coupled to said third terminal.

4. The circuit of claim 2 wherein said push-pull driver stage includes:
   upper transistor switching means for sourcing current to said output of said push-pull driver stage responsive to a first control signal supplied thereto;
   lower transistor switching means for sinking current from said output of said push-pull driver stage responsive to a second control signal supplied thereto; and
   phase splitter means responsive to said clock signal for alternately providing said first and second control signals.

5. The circuit of claim 4 wherein said circuit means includes:
   a Nφ circuit for providing a substantially constant voltage at an output thereof; and
   a first transistor having a base coupled to said output of said Nφ circuit, an emitter coupled to an input of said upper transistor switching means and a collector coupled to a source of operating potential.

6. The circuit of claim 5 wherein said phase splitter means includes a second transistor having a base to which said clock signal is supplied, an emitter coupled both to said second power supply conductor and an input of said lower transistor switching means and a collector coupled to said input of said upper transistor switching means.

7. The circuit of claim 6 wherein:
   said upper transistor switching means includes a third transistor and a fourth transistor each having an emitter, a base and a collector, said collectors of said third and fourth transistors being coupled to said first power supply conductor, said base of said third transistor being said input of said upper transistor switching means and said emitter being coupled to said base of said fourth transistor, and said emitter of said fourth transistor being coupled to said output of said push-pull driver stage; and said lower transistor switching means includes a fifth transistor having a base coupled to said emitter of said second transistor, an emitter coupled to said second power supply conductor and a collector coupled to said output of said push-pull driver stage.

8. The circuit of claim 7 wherein said push-pull driver stage includes first and second diodes serially connected between said base of said second transistor and said output of said push-pull driver stage.

* * * * *